United States Patent Office 3,405,181
Patented Oct. 8, 1968

3,405,181
POLYTHIOETHER DIENES AND THEIR PREPARATION
Bernard Gourdon, Pau, France, assignor to Societe Nationale des Petroles d'Aquitaine, Paris, France
No Drawing. Filed Mar. 15, 1965, Ser. No. 439,998
Claims priority, application France, Mar. 16, 1964, 967,517
12 Claims. (Cl. 260—609)

ABSTRACT OF THE DISCLOSURE

A process for producing polythioether dienes containing a chain of —$CH_2S$— groups with an alkenyl radical connected to each end thereof, wherein at least two molecules of diene are reacted with one molecule of polythioether dithiol.

---

The new chemical products according to the invention are suitable for synthesis of various sulphur-containing organic compounds. They can also be used for the preparation of plastics. The new products are characterised by a chain containing —$CH_2S$— groups terminated on each end by an ethylene hydrocarbon radical; they may be represented generally by the following diagrammatic formula:

$$R—CH_2S(CH_2S)_n—CH_2—R' \qquad (1)$$

wherein the hydrocarbon radicals R—$CH_2$— and R'—$CH_2$— are alkenyl groups, R and R' being identical or different.

In the products to which the present invention relates more particularly, the number $n$ of —$CH_2S$— groups is generally from 2 to 7. Very useful products are mixtures of substances in which $n$ varies mainly between 3 and 4, the mean value of $n$ being approximately 3.5.

The alkylene radicals R and R' may contain a number of carbon atoms varying within wide limits but usually between 3 and 30. The radicals R and R' of polythioether dienes which are very useful in practice contain from 3 to 6 carbon atoms.

Thus R and R' whether identical or different may be of the following form:

$$—(CH_2)_m—CH=CH—(CH_2)_p—CH_3$$

or $$—(CH_2)_r—CH=CH_2$$

the values of $m$, $p$ and $r$ being such that generally $(m+p+3)$ is from 3 to 30, or $(r+2)$ is equal to 3–30.

The compounds synthesised according to the invention may have different configurations. For example, when the diene used is isoprene, the following three isometric forms may be obtained for the radical R and/or R' of Formula (1):

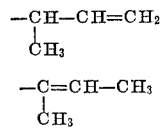

and

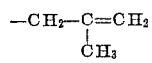

A process for the preparation of the new products described comprises reacting two molecules of a diene with one molecule of a polythioether dithiol or polythioformaldehyde.

In one specific embodiment of the new process, the polythioether dithiol used is one or more thioformaldehyde liquid oligomers HS($CH_2S$)$_n$H wherein $n$ may range from 2 to 7; excellent results are obtained with a liquid having a mean $n$ of between 3 and 4.

A specific case which is very practical industrially comprises reacting one molecule of a liquid mixture of the above polythioformaldehyde with a molecular weight of about 170 to 220, more particularly about 190, with at least 2 molecules of a conjugate diene. More particularly, the latter may be butadiene or methylbutadiene.

New products according to the invention may also be obtained by the combination of the above polythioether thiols and other conjugate diolefins, for example 1,3-hexadiene; 1,3-heptadiene; 1,3-octadiene and 3,5-octadiene; 2,4-octadiene; 1,3-dodecadiene and 4,6-dodecadiene; 2,4-dodecadiene; 3-propyl 1-3-undecadiene; 3-ethyl 1,3-decadiene; 2-ethyl 4,6-decadiene; 1,3-tetradecadiene; 3-ethyl-1,3-tetradecadiene; 7,9-heptadecadiene; 7-methyl 7,9-heptadecadiene; docosadiene.

Also, the process according to the invention may be applied to non-conjugate diolefins, for example; 1,5-hexadiene; 1,5-heptadiene; 1,7-octadiene; 5-methyl 1,5-heptadiene; 2-methyl 1,7-octadiene; 2,6-octadiene; 8-ethyl 1,8-decadiene; 10-ethyl 1,9-dodecadiene; 6-butyl 2,10-hecadecadiene; 1,6-docosadiene, etc.

The addition reaction according to the invention may be performed either with or without a solvent, at temperatures ranging from —20° C. to +180° C., but preferably between 15 and 50° C. It occurs in the presence of free radical catalysts; for example Friedel-Crafts type catalysts may be used, e.g. anhydrous $AlCl_3$, $BF_3$, etc., peroxides, or else the operation may be carried out in the presence of ultra-violet rays.

Various inert solvents may be used, inter alia aliphatic hydrocarbons, such as heptane, octane, petroleum oil, petroleum ether, cyclohexane, and more particularly aromatic hydrocarbons, more particularly benzene, toluene, xylene etc. The solvent chosen is inert with respect to the reagents and preferably its boiling point does not exceed 180° C.

The process is carried out at atmospheric pressure or a higher pressure depending upon the temperature and type of the diene or dienes used.

In a first method of working, a single molecule of diene is first combined with 1 mole of polythioformaldehyde; the second molecule of diene is then combined in a second stage. This method allows two different —$RCH_2$— and —$R'CH_2$— alkenyl groups to be used if required. To this end the first stage of operation is carried out with a given diene while another diene is used in the second stage. For example, 1 mole of isoprene is combined in the first stage and 1 mole of butadiene in the second stage.

Thus one of the possible reaction diagrams is as follows:

I

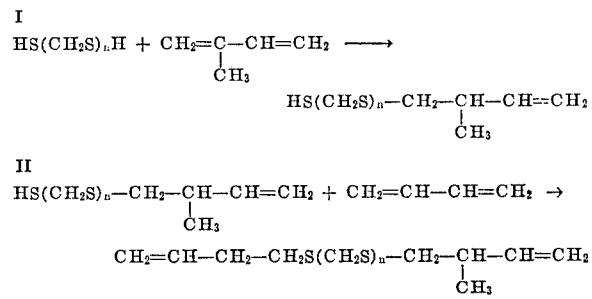

The first of the stages, which results in the formation of a polythioether thiol having one double bond, is advantageously carried out with a slight excess of diene, more particularly a few percent excess. It is also advantageous to use an excess of diene in the second reaction, i.e. the one giving the final polythioether diene; in this case a much larger excess may advantageously be used.

Another method comprises reacting in one operation at least two molecules of diene with 1 mole of polythioformaldehyde under the above conditions.

In this case the reaction may be written as follows for example:

$2CH_2=CH-CH=CH_2 + HS(CH_2S)_nH \rightarrow CH_2=CH-CH_2-CH_2S(CH_2S)_n-CH_2-CH_2-CH=CH_2$ but butadiene can of course be replaced by another conjugate or non-conjugate diene, more particularly a diolefin containing up to 30 carbon atoms.

Of course a mixture of different dienes may be used instead of a single diene, in which case the product obtained may consist of a mixture of different polythioether dienes.

A practical means of following the reaction and determining the end comprises determining the SH function during the contact time betwen the diene or dienes and polythioformaldehydes; the first stage is concluded when half of the initial SH has disappeared; at the end of the second stage all the SH must have disappeared.

The invention will be illustrated by the following non-limitative examples of embodiment.

EXAMPLE 1

First stage of operation 1 litre of xylene is placed in a reactor provided with an effective agitator and condenser, and 190 g. of liquid polythioformaldehyde of the above-indicated formula is first added, the mean value of the number $n$ being 3.7; 68 g. of freshly distilled isoprene, i.e., 2-methyl 1,3-butadiene, and 5 g. of anhydrous aluminum chloride were then introduced. The mixture was agitated for 8 hours, the temperature being kept at 22° C. for the entire operation.

At the end of that time the xylene solution contained a polythioether thiol of a molecular weight of 274 (determined by cryoscopy in benzene); this substance contained 12.8% SH, i.e. 0.98 SH equivalent per molecule.

Second stage of operation

After evaporation of the xylene and washing and drying of the unsaturated polythioether, approximately 80 g. of isoprene was added to 206 g. of the polythioether, i.e. an excess with respect to the 51 g. theoretically required. The mixture was then placed in a hermetically sealed glass bottle which was exposed to sunlight and kept at a temperature of 20° C. After 80 hours' exposure to light, analysis showed complete disappearance of the SH function. The excess isoprene was then evaporated at 34° C. under atmospheric pressure. The resultant product after drying had a sulphur content of 44% and a molecular weight of 342 determined by cryoscopy in benzene.

Analysis with bromine indicated the presence of two double bonds, which were also distinctly apparent on infrared analysis; this analysis confirms the disappearance of the band attributable to the SH group.

The resultant polythioether diene had a specific gravity of 1.104 at 20° C. and a refractive index of 1.5823.

EXAMPLE 2

To 206 g. (1 mole) of liquid polythioformaldehyde oligomer with an SH content of 32% there was added 204 g. of freshly distilled isoprene, i.e., 3 moles instead of the two moles required stoichiometrically.

The mixture was placed in a hermetically sealed glass container and exposed to light and kept at a temperature of 25° C. The reaction was followed by checking the presence of SH. No more SH was found after 88 hours. After evaporation of the excess isoprene, the product obtained contained 44% of sulphur and had a molecular weight of 342 (cryoscopy in benzene). Analysis with bromine indicated the presence of two double bonds which was confirmed by infrared analysis. The polythioether diene was therefore the same as in Example 1.

EXAMPLE 3

In the second stage of operation of Example 1 the isoprene was replaced by 1.5 moles, i.e. 123 g. of 2,4-hexadiene, the other conditions of operation being the same. The resultant polythioether diene had a molecular weight of 356.

EXAMPLE 4

The isoprene of Example 2 was replaced by 2,4-heptadiene. The resultant polythioether diene had a molecular weight of 401.

EXAMPLE 5

The isoprene of Example 2 was replaced by 1,5-hexadiene (biallyl). The polythioether diene obtained had a molecular weight of 370° g.

EXAMPLE 6

172 g. of polythioformaldehyde oligomer (number of $CH_2S$ groups=3) and an excess of 1,3-butadiene (4 molecules, i.e. 216 g.) were added in a reaction bottle provided with means for maintaining pressures above atmospheric. The system was kept at 20° C. under pressure and exposed to ultra-violet rays. At the end of 250 hours the excess butadiene was eliminated by single evaporation and after washing and drying, 280 g. were obtained of a polythioether diene containing two double bonds of the ethylidene type, the addition being carried out on 1,4-diolefin in accordance with the anti-Markownikoff rule.

EXAMPLE 7

172 g. of polythioformaldehyde oligomer (3 $CH_2S$ groups) and 136 g. of 1,4-pentadiene in 800 g. of benzene were placed in a reactor provided with a bladed agitator and means for maintaining pressures above atmospheric. 5 g. of $Cl_3Al$ were added. The system was kept at 35° C. for 6 hours. After distillation and washing, a polythioether diene containing two double bonds and with a molecular weight of 306 g. was withdrawn.

EXAMPLE 8

The apparatus is identical to that used in Example 1, and toluene is used. To it is added 190 g. of liquid polythioformaldehyde ($n=3.65$). 140 g. of freshly distilled isoprene was introduced. The system was agitated at 20° C. for 2½ hours. 15 g. of azo-bis-isobutyronitrile were then added. The mixture was heated to 100° C. and after 2½ hours the SH content of the solution was nil.

After distillation of the excess isoprene and toluene, a polythioether diene of a molecular weight of 339 was obtained after washing and drying.

I claim:

1. A product of the formula $$R-CH_2S(CH_2S)_n-CH_2-R'$$

wherein R and R' are identical or different alkenyls containing 3–30 carbon atoms, $n$ having a mean value from 2–7.

2. A product according to claim 1, characterized in that each of the alkenyls R and R' contains from 3–4 carbon atoms.

3. A product according to claim 1, characterized in that $n$ has a value ranging from 3–4 while each of the alkenyls R and R' contains from 3–6 carbon atoms.

4. A process for producing an aliphatic polythioether diene having a chain of $-CH_2S-$ groups with an alkenyl group of at least 4 carbon atoms, characterized in that 2 to 4 moles of a diene having 4 to 31 carbon atoms are reacted with one mole of a polythioether dithiol of the formula $HS(CH_2S)_nH$ in which the number $n$ is 2 to 7, at a temperature of −20° to +180° C., in the presence of a free radical catalyzing agent.

5. The process of claim 4 in which the polythioether dithiol and the diene are in solution in an inert solvent selected from the group consisting of aliphatic and aromatic solvents.

6. The process of claim 4, characterized in that it is performed in two stages; (1) reaction of less than 2 moles of diene with 1 mole of polythioether dithiol for formation of a polythioether thiol; and (2) reaction of the polythioether thiol with an additional quantity of the same or a different diene to convert the polythioether thiol to a polythioether diene.

7. The process of claim 4 in which $n$ is 3–4.

8. The process of claim 7 in which the diene has 4–5 carbon atoms.

9. The process of claim 8 in which the catalyst is anhydrous aluminum chloride.

10. The process of claim 8 in which the catalyst is azo-bis-butyro-nitrile.

11. The process of claim 8 in which the catalyzing agent is ultra violet light.

12. The process of claim 8 in which the temperature is kept between 15 and 50° C.

References Cited

UNITED STATES PATENTS 2,454,409  11/1948  Schulze et al. _____ 260—609

OTHER REFERENCES

Reid: Organic Chemistry of Bivalent Sulfur, vol. II, pp. 30, 31, 34 (1960) QD 412.

CHARLES B. PARKER, *Primary Examiner.*

D. R. PHILLIPS, *Assistant Examiner.*